Feb. 14, 1939.          E. W. SWANSON          2,146,778
DEVICE FOR REGULATING A CONDITION OF A MAIN CIRCUIT
        CONTROLLED BY AN AUXILIARY CIRCUIT
        Filed April 3, 1936        2 Sheets-Sheet 1

INVENTOR
EDWIN W. SWANSON
BY
Akel C. Benson
HIS ATTORNEY

Feb. 14, 1939.   E. W. SWANSON   2,146,778
DEVICE FOR REGULATING A CONDITION OF A MAIN CIRCUIT
CONTROLLED BY AN AUXILIARY CIRCUIT
Filed April 3, 1936   2 Sheets-Sheet 2

INVENTOR.
EDWIN W. SWANSON
BY Akel C. Benson
HIS ATTORNEY

Patented Feb. 14, 1939

2,146,778

UNITED STATES PATENT OFFICE 2,146,778

DEVICE FOR REGULATING A CONDITION OF A MAIN CIRCUIT CONTROLLED BY AN AUXILIARY CIRCUIT

Edwin W. Swanson, Hopkins, Minn., assignor to Electric Machinery Manufacturing Company, Minneapolis, Minn.

Application April 3, 1936, Serial No. 72,596

18 Claims. (Cl. 171—119)

My invention relates to devices for regulating conditions in a main electric circuit controlled by an auxiliary circuit and has for an object to provide a device responsive to the potential and current of the main circuit for controlling the current in said auxiliary electric circuit.

Another object of the invention resides in providing a device utilizing two inductances energized by the potential and current of the main circuit and acting jointly to control the current in the auxiliary circuit.

A specific object of the invention resides in providing control means for regulating alternating current motors of the synchronous type by controlling the direct current excitation to the field winding of the synchronous motor so as to obtain better motor performance, higher efficiency, greater pull-out torque at heavy loads, and a more uniform power factor over the entire load range of the motor.

Another object of this invention is to provide a regulating device which will cause the motor to produce an instantly responsive increase in motor pull-out torque to meet any sudden increase in load.

A further object of the invention is to provide a motor and control system which in case of a short circuit on the motor or its connected electrical system operates instantly to weaken the main field magnetic flux in the motor poles and thereby reduce the generated voltage so as to reduce considerably the magnitude and duration of the short-circuit current, which often determines the size and cost of the necessary switches and equipment.

Another object of the invention resides in providing a regulating device for controlling the power factor of a synchronous motor, the corrective effect of which depends jointly upon changes in the motor voltage, current, and power factor.

A further object of the invention is to provide a device simple and economical in design, and one which may have no moving parts or contacts.

A further object of my invention is to provide a regulating device for varying the direct current excitation to the synchronous motor so as to increase or decrease the power factor or to maintain the same constant with increase of motor load.

An object of the invention is to provide a regulating device for controlling the motor field excitation which is automatically and inherently responsive to changes in the motor voltage, the motor current, and/or the motor power factor.

Another object of my invention is to provide a regulating device which automatically increases the direct current excitation with increase of load on the motor so as to hold up the line voltage.

An object of the invention resides in providing a regulating device including rectifying means for providing field excitation current without the use of the usual direct-current generators.

Another object of the invention is to provide a regulating device having a magnetic core of three or more legs with inductive windings disposed thereon and connected in such a manner that the flow of flux is in the same general direction through one of the legs.

An object of the invention is to provide a regulating device which includes a regulating winding energized by the resultant flux of two windings which in turn are energized by the potential and the current of the main circuit.

A still further object of the invention resides in providing a method of procuring predetermined operating characteristics of a synchronous motor upon variation in loading which consists in varying the excitation current of the field winding of the motor in accordance with the motor potential, motor current and with or without the power factor.

Another object of the invention resides in providing a method in which flux components are produced by the motor potential and current, and in which regulation is procured by the resultant flux produced thereby.

These, and other objects and advantages of the invention will be fully set forth in the following description made in connection with the accompanying drawings which illustrate several modifications of my invention, and in which like reference characters refer to similar parts throughout the several views.

It will readily become apparent from the following description that the invention may be put to any number of different uses where a main circuit is controlled by an auxiliary circuit. A practical application of the invention is in a synchronous motor circuit and for the purpose of illustration only such application of the invention has been shown and described. In such application, the main circuit is the armature circuit and the auxiliary circuit is the circuit or circuits associated with the field winding.

It is well known that where the field excitation of a synchronous motor is fixed and load is then applied upon the motor, the power factor decreases, the armature current increases out of proportion to the load, the efficiency becomes lower, and the motor becomes more subject to stalling due to insufficient torque. In addition when a short circuit occurs in the power line, the motor acts as a generator and feeds current into the short circuit, thereby increasing the magnitude and duration of the short-circuit current. The present invention overcomes all of these objections by varying the field excitation current in accordance with the load so that any desired performance of the motor can be procured. The structure for producing these results will now be described in detail.

Figure 1:
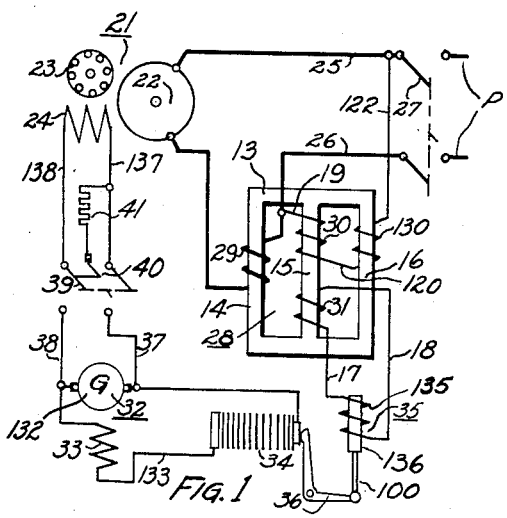
Fig. 1 is a wiring diagram illustrating an embodiment of my invention for use with single-phase power.

In Fig. 1 is illustrated at 21 a synchronous electric motor of single-phase type having an armature 22, a squirrel-cage winding or damping secondary winding 23, and a field winding 24. The motor 21 receives alternating current through leads 25 and 26, which are connected by means of a switch 27 to a power line P.

A direct-current generator 32 is used to supply direct-current excitation to the motor field winding 24. This generator comprises an armature 132 and a shunt field winding 33. The terminals of the armature 132 of generator 32 are connected through leads 37 and 38 to a field switch 39. This switch is further connected by means of leads 137 and 138 to the field winding 24.

In conjunction with the field winding 24, a field discharge resistance 41 is employed which is connected to lead 137 and to an auxiliary switching member 40 operable with the switch 39 and connected to lead 138. This resistance prevents injury to the field winding during starting.

The shunt field winding 33 of generator 32 is connected in a shunt field circuit 133 which is connected to the terminals of the armature 132. In series with the shunt field winding 33 in circuit 133 is a carbon pile resistor 34 which is operated by a magnetic solenoid 35. This solenoid comprises a winding 135 and a plunger or armature 136 adapted to be moved upwardly when the winding 135 is energized. A lever 36 is operated by the plunger 136 through a link 100. This lever in turn serves to compress the carbon pile resistor 34 when the solenoid 35 is actuated, thereby reducing the resistance of said resistor inversely as some function of the current flowing through winding 135 of said solenoid.

My invention includes a regulating device which I have indicated in its entirety by the reference numeral 28. This regulating device comprises a magnetic core 13 constructed with three parallel branches or legs 14, 15 and 16. The leg 14 is provided with a current winding 29 which is connected in the lead 26 to the motor armature 22. This winding receives the entire current flowing in the armature, though, if desired, only a portion of the armature current may be utilized. The leg 15 is provided with a potential winding 30 and the leg 16 is likewise provided with a potential winding 130. These windings are connected together by means of a conductor 120, the connection being such that both windings produce flux in the same direction in the magnetic circuit including legs 15 and 16. The windings 30 and 130 are further connected to conductors 19 and 122 which in turn are connected to leads 26 and 25 respectively, thus subjecting the windings 30 and 130 in series to the motor potential. The current winding 29 is so connected that the resultant flux in leg 15 is greater than the flux produced thereby or the flux produced by the windings 30 and 130.

The regulating device 28 includes a regulating winding 31 which is connected to conductors 17 and 18. These conductors are connected to the winding 135 of solenoid 35. By means of winding 31, solenoid 35 is energized and the position of the plunger 136 is controlled by the amount of current induced in winding 31.

It is common knowledge that the necessary direct-current excitation to produce any desired power factor at any load on a synchronous motor is equal to the sum of the field current which compensates for the effect of magnetic saturation at the internal voltage and the vectorial sum of the field current necessary to obtain normal voltage on the air-gap line of the saturation curve on open circuit added at the proper power-factor angle to the field current necessary to obtain normal armature current on short circuit.

In the present invention the resultant flux in leg 15 of core 13 is equal to the vectorial sum of the flux components produced by winding 29 and the windings 30 and 130 since these windings are energized by the current and potential respectively of the motor. Since the flux components produced by the current and potential of the motor have the same phase angle as the components of the excitation current above referred to and since the motor current varies with the short-circuit excitation current and the motor potential varies with the no-load excitation current, it follows that the resultant flux in leg 15 and the induced voltage in winding 31 vary with the excitation current required to operate the motor at a predetermined power factor with change of load. It will thus be seen that if the load on the motor is increased, the motor current increases and the induced voltage in winding 31 correspondingly increases. Likewise, if the power factor in the motor power circuit is changed, a corresponding change in angle between the flux components in leg 15 occurs which produces a corresponding change in the induced voltage in winding 31. This increase in induced voltage in winding 31 operates on resistance 34 and produces a corresponding increase in shunt field current for generator 32, which is of such a magnitude as to supply the added field excitation current necessary to take care of the added load and that necessary to maintain the desired power factor where a constant power factor is desired. Automatic regulation is hence procured and the field excitation current of the motor is at all times automatically maintained at the proper value throughout the load range of the motor to produce the desired motor operating characteristics, such as power factor, pull-out torque and efficiency. By the selection of a resistance having the proper characteristics for use as resistor 34, either a leading or lagging power factor can be procured or the power factor may be maintained at any predetermined value. In a similar manner, compensation may be had for saturation excitation current.

It will be noted that the response of the motor 21 to the action of regulating device 28 is subject to the time lag required for building up the voltage of the generator 32. It is obvious to one skilled in the art that the essential elements of the regulating device 28 and of resistor 34 may be enlarged for greater current capacity so that said resistor can be connected directly in series with the motor field winding 24. In such case direct current excitation may also be obtained from any source such as a D. C. bus, batteries or manually adjustable generators. In this latter form, the time lag for increasing the field excitation is reduced considerably.

Figure 2:
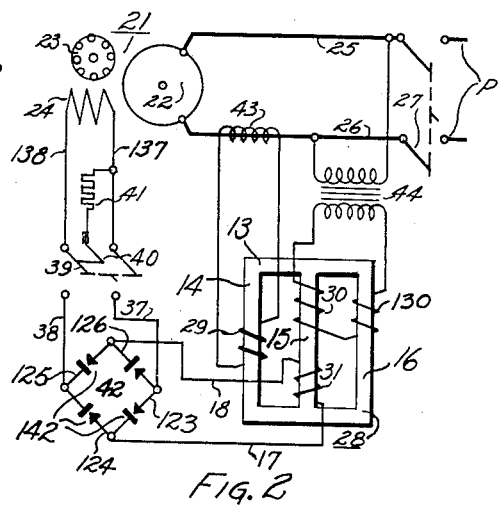
Fig. 2 is a view similar to Fig. 1 showing a modification of the invention.

In Fig. 2 I have shown a modification of the invention illustrated in Fig. 1. Since most of the parts or elements of this form of the invention are identical with those shown in Fig. 1, the description thereof will not be repeated and the same reference numerals will be used to designate corresponding parts or elements.

In the form of the invention shown in Fig. 2 the generator 32, resistor 34 and solenoid 35 are dispensed with and a bridge rectifier utilized which I have indicated in its entirety by the reference numeral 42. This rectifier comprises four rectifying elements 142 which are connected together in the form of a bridge by means of conductors 123, 124, 125 and 126. The conductors 124 and 126 are directly connected to conductors 17 and 18 leading from the winding 31. In a similar manner conductors 123 and 125 are directly connected to conductors 37 and 38, which supply direct-current excitation to the motor field winding 24.

In this form of the invention, the winding 31 furnishes the current which is rectified and delivered to the field winding of the motor instead of controlling the operation of generator 32 which furnishes the excitation current in the form of the invention shown in Fig. 1. Since the excitation current is derived from winding 31, regulation is directly procured. In this case the excitation current would be governed by the design of the regulating device 28, which would be designed to produce the desired operating characteristics for the motor 21.

In Fig. 2 the current for energizing winding 29 is procured from a current transformer 43 which is directly energized by the motor current through lead 26, instead of said winding being directly connected in the power circuit. Similarly, potential for windings 30 and 130 is procured from a potential transformer 44 which is energized by the motor potential instead of said windings being directly connected across leads 25 and 26 as in the other form of the invention. This is particularly advantageous where the current and voltage are great and where a predetermined current is to be supplied by winding 31. It can, however, be readily comprehended that windings 29, 30 and 31 may be directly connected as shown in Fig. 1 and the regulating device 28 designed accordingly.

The form of the invention shown in Fig. 2 operates in the same manner as that shown in Fig. 1 to supply excitation current to procure the proper operating characteristics for the same load range as the form of the invention disclosed in Fig. 1.

Figure 3:
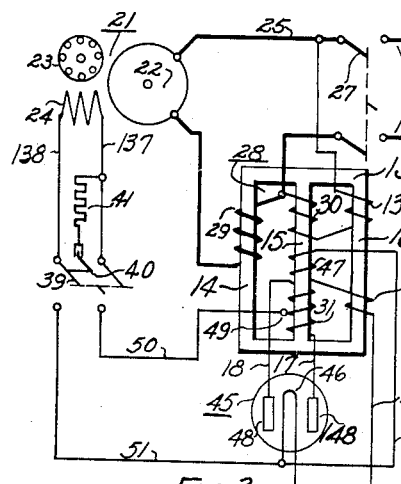
Fig. 3 is a view similar to Fig. 1 showing still another modification of the invention.

In Fig. 3 I have shown a modification of the invention illustrated in Fig. 1. In this modification, a thermionic full-wave rectifier 45 is utilized in place of the generator 32 and associated parts of Fig. 1. The thermionic rectifier 45 comprises a cathode 46, and two anodes 48 and 148. Anode 48 is connected to the regulating winding 31 by conductor 18 and the other anode 148 is connected to the other terminal of the regulating winding 31 by conductor 17. A center tap 49 of regulating winding 31 is connected to a conductor 50 which is connected to the field switch 39.

The cathode 46 is of the filament type and is heated by external means. For this purpose two heater windings 47, and 147 are used, the winding 47 being disposed on leg 15 and the winding 147 on leg 16. These windings are connected in series and are connected to the filament 46 by means of conductors 145 and 146. The filament 46 is connected to the field switch 39 by means of a conductor 51.

The operation of this form of the invention is similar to that of the invention shown in Fig. 2. The rectifier 45 supplies excitation current directly to the motor field winding 24 and this current is regulated in accordance with the current, voltage and power factor of the load, to produce the desired operating characteristics of the motor.

Figure 4:
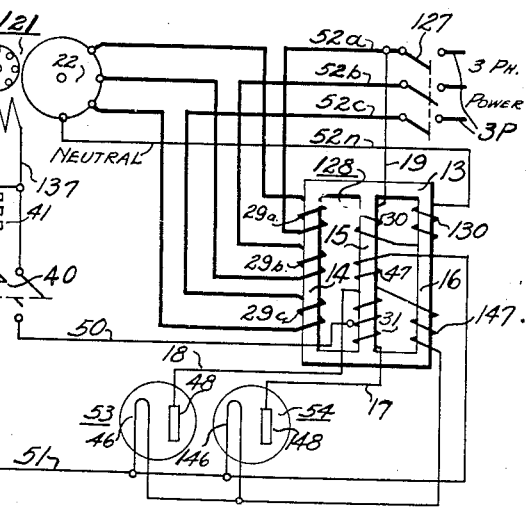
Fig. 4 is a wiring diagram illustrating an embodiment of my invention for use with three-phase power.

In Fig. 4 I have shown an embodiment of my invention utilizing a three-phase synchronous motor 121. Since this motor is similar to motor 21, the same reference numerals will be used to designate similar parts, including the field excitation circuit and the switch therein. Motor 121 is energized by a three phase power circuit 3P which is connected to a switch 127. Switch 127 is connected by means of three leads 52a, 52b and 52c to the armature 22 of the motor. A lead 52n is connected to the neutral of the stator winding 22 of motor 121. The use of this lead will be subsequently described.

A regulating device 128 shown in the embodiment of Fig. 4 differs from the regulating device 28 of Figures 1, 2 and 3 in that it carries three current windings 29a, 29b, and 29c on the core leg 14 instead of the single winding 29. These windings are connected in series with the leads 52a, 52b and 52c, respectively, and receive the full current passing through the three phases of the motor. The two potential windings 30 and 130 are connected across one phase only, which is accomplished by connecting lead 52n to winding 130, and by running the conductor 19 connected to winding 30 to the lead 52a. In order to prevent the three flux components produced by windings 29a, 29b and 29c from neutralizing one another, one of there windings is reversed. To cause the flux components of these windings and the flux component of windings 30 and 130 to flow in leg 15 in a manner to make the resultant flux in this leg greater than either component, it is necessary to reverse the current winding in the lead to which the potential winding is connected. This would be the winding 29a.

A thermionic rectifier may be used with the regulator 128 if desired. This rectifier would be connected to the regulating winding 31, the heater windings 47 and 147, and the switch 39 in identically the same manner as the rectifier shown in Fig. 3. For the purpose of illustration, two half-wave rectifiers 53 and 54 have been used instead of a full-wave rectifier. The two anodes 48 and 148 thereof are connected to regulating winding 31 and the two filaments 46 and 146 thereof are connected in parallel to the heater windings 47 and 147.

Figures 5, 6:
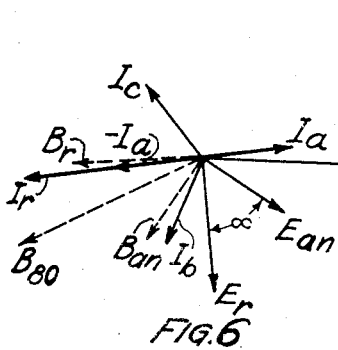
Fig. 5 is a vector diagram illustrating the relation of the currents, voltages and fluxes in the form of the invention shown in Fig. 4 when the motor is operating at unity power factor.
Fig. 6 is a view similar to Fig. 5 illustrating the relation of the currents, voltages and fluxes in the form of the invention shown in Fig. 4 when the motor is operating at a leading power factor.

Fig. 5 is a vector diagram illustrating the relation between the voltages, currents and fluxes in the form of the invention shown in Fig. 4. The voltage vectors are designated by the reference character E with suffixes indicating the leads across which the voltages are taken. The current vectors are indicated by the reference character I together with similar suffixes indicating the leads in which the currents flow. The flux vectors are indicated by the reference character B with a suffix designating its source. It will thus be seen that $Eab$ represents the voltage between motor leads 52a and 52b, and $Ean$ represents the voltage from lead 52a to the neutral lead 52n going to the star or neutral potential of armature winding 22. For unity power-factor operation, the motor currents will be in phase with their respective voltages to neutral, hence the motor currents may be represented by $Ia$, $Ib$ and $Ic$. My invention utilizes the voltage $Ean$ for energizing the potential windings 30 and 130. Since all three currents are used, the vectorial sum of the same would be zero. To overcome this, one of the windings, namely winding 29a, is reversed. Thus the vectorial sum of the three currents—$Ia$, $Ib$ and $Ic$ is a finite quantity and is represented by the vector $Ir$. Since the current windings are reactive, the resultant current $Ir$, must lag its corresponding voltage $Er$, by an angle somewhat less than 90° as shown. This voltage $Er$ produces in leg 14 a flux $Br$ which varies therewith. Similarly $Ean$ produces a flux $Ban$ in legs 15 and 16, and the amount of this flux varies with said voltage. These fluxes combine in leg 15 to produce a resultant flux $Bu$ that is equal to the vectorial sum of the aforementioned fluxes.

As hereinbefore explained, unity power-factor excitation of a synchronous motor is approximately equal to the vectorial sum of the field excitation current necessary to obtain normal voltage on open circuit added at 90° to the field excitation current necessary to obtain normal current on short circuit. Now the flux $Ban$ due to the potential windings 30 and 130 may be compared to the field excitation current necessary to obtain normal voltage on open circuit and the flux $Br$ due to the current windings 29a, 29b and 29c, may be compared to the field excitation current necessary to obtain normal full-load current on short-circuit conditions and further since the phase angle in both instances is substantially 90°, it becomes evident that the resultant flux $Bu$ in leg 15 varies in proportion to the necessary field excitation current to maintain unity power-factor operation from no load to full load. In order to obtain this characteristic the regulating device 28 must be liberally designed so that the operating range lies on the straight part of the magnetization curve before reaching saturation. Thus at no load, or at full the flux $Bu$ in leg 15 will vary to provide the necessary field excitation current to the motor field winding 24 and thereby maintain unity power-factor operations at all loads.

Fig. 6 is a similar vector diagram to that of Fig. 5 except that it illustrates how my invention maintains 80% leading power-factor operation for the same motor load. The same voltage vectors are present as in Fig. 5 but the vectors of the motor currents have increased about 25% in length (assuming the same load) and the motor currents lead their respective voltages by a phase angle whose cosine or power factor is 0.80. Since the same current winding 29a on leg 14 is still reversed, its vector is shown as $-Ia$ and the result of the three currents is $Ir$ which lags its corresponding voltage $Er$. The voltage vector $Ean$ is utilized to energize the potential windings 30 and 130. Thus in the regulating device 28, the resultant flux $B80$ will be equal to the vectorial sum of the fluxes $Br$ and $Ban$ due to the voltages $Er$ and $Ean$ respectively. This flux varies in proportion to the necessary field excitation current to maintain substantially 80% leading power-factor operation from no load to full load. At no load, the motor current is small but sufficient so that its effect on the regulating device 28 along with that due to the motor voltage produces a field excitation current which maintains 80% power-factor operation of the motor 121. With increase of load, the motor current increases so that its effect represented by the vector $Ir$ along with that due to the motor voltage produces an increased flux in leg 15 and thereby produces an increased field excitation current which also maintains 80% leading power factor at intermediate and full loads.

By comparison of Figs. 5 and 6, it will be noted that with the same load and with more leading power factor, the current vectors increase in length and the phase angle between said current vectors and their respective voltages become greater. With this increase of phase angle, the angle $\alpha$ between $Ean$ and $Er$ decreases, which results in a greater flux as shown by $B80$. It will be noted that with increase of power factor, the voltage vector $Er$ increases in length (assuming the same load) and the angle $\alpha$ between $Ean$ and $Er$ decreases, both of which act through their respective windings to increase the flux in leg 15 as shown by the increased vector $B80$ and thereby furnishes increased excitation current to the motor field winding 24. Similarly, with decrease of power factor, the flux is decreased as shown by vector $Bu$ and the device thereby furnishes reduced excitation current to the motor field winding 24. It will thus be noted that the amount of flux through the leg 15 is a function of the motor voltage, the motor current, and the motor power factor, since this flux varies with each of the three variables and combinations of the same so as to derive net results which compensates for each variable under all conditions. Accordingly, with proper design, the power factor can be maintained at a predetermined desired value or can be controlled so as to result in a more leading or a more lagging power factor with increase of motor load.

Figure 7:
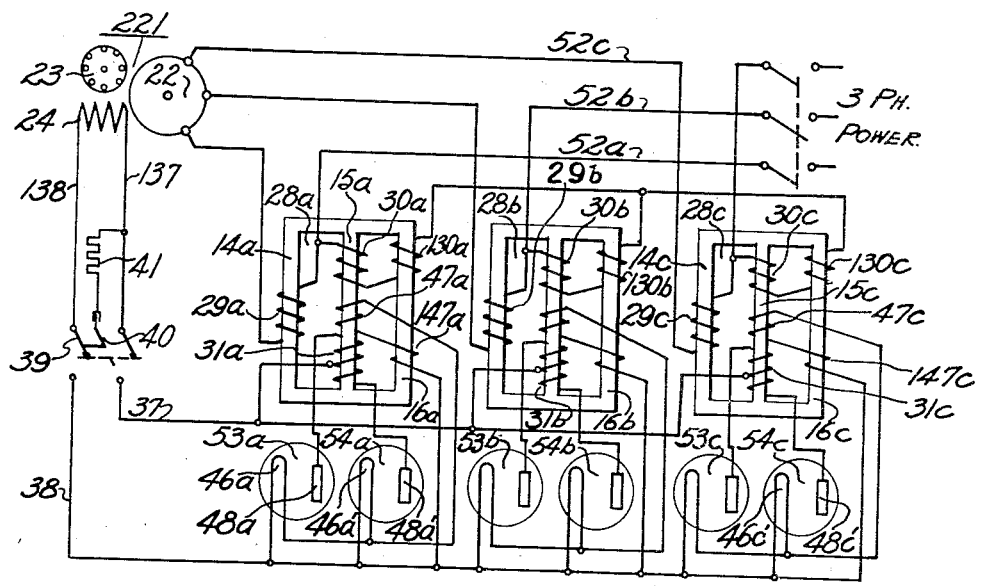
Fig. 7 is a wiring diagram illustrating a form of the invention similar to that shown in Fig. 4.

In Fig. 7 I have shown a modification of my invention applied to a three-phase synchronous motor 221. In this form of my invention, I utilize three regulating devices 28a, 28b and 28c. These regulating devices are similar to the regulating device 28 of Fig. 4. The description thereof will hence not be repeated and the same reference characters will be used to identify the identical parts. The reference suffixes $a$, $b$ and $c$ will be added to these reference characters to identify the parts of the respective regulating devices 28a, 28b and 28c. In this form of the invention, the current windings 29a, 29b and 29c are disposed on legs 14a, 14b and 14c of the respective devices 28a, 28b and 28c. These current windings are all reversed and are energized by the respective phase currents of the motor the same as in the other form of the invention. In addition to the potential windings 30 and 130 of the other form of the invention which is energized by phase voltage Ean and which are in Fig. 7 designated by the reference characters 30a and 130a, I utilize other potential windings 30b, 130b and 30c, 130c which are connected across the leads 52b and 52n, and across leads 52c and 52n respectively. These windings are disposed on the legs 15a, 16a, 15b, 16b, 15c and 16c of the respective regulating devices 28a, 28b and 28c.

The three pairs of heater windings 47a and 147a, 47b and 147b, and 47c and 147c are connected and energized as in Fig. 4 to furnish the cathode voltages to the six half-wave rectifiers, 53a and 54a, 53b and 54b, and 53c and 54c. The three regulating windings 31a, 31b and 31c are also connected and energized as in Fig. 4 to furnish the anode voltages to the same six respective rectifiers. The direct current output of these six rectifiers supplies the direct-current excitation to the motor field winding 24 as previously described. It will be noted that the current windings 29a, 29b and 29c are all reversed in this embodiment, and each regulating device 28a, 28b and 28c operates in conjunction with its windings thereon and its pair of half-wave rectifiers to produce the necessary direct-current excitation to the motor field winding 24.

Since the operation of the form of the invention shown in Fig. 7 is similar to that shown in Fig. 4, the explanation thereof will not be repeated.

Actual tests made with the various forms of my invention show excellent results. In a test made with a 125 H. P. motor and a regulating device such as shown in Fig. 7, the motor load was increased from no load to 110% of full load. Throughout this entire load range, the power-factor varied only three tenths of one percent (0.3%) from unity (100%) power factor; and the field excitation current to the motor field winding increased from 7.0 amperes at no load to 10.8 amperes at full load and to 11.2 amperes at 110% of full load of the motor. Simultaneously, the pull-out torque increased in approximate direct ratio with the increase of field excitation current. The heating of the motor field winding was considerably reduced at light loads since the heating varies as the square of the field excitation current. Also, the heating of the motor armature windings was reduced by holding unity power factor. In this test, the core section of each of the three legs of the regulating devices was approximately 6.25 square inches, each current winding had 14 turns; and for 800 volts the potential windings each had 350 turns, the heater windings each had 4 turns, and the regulating windings on the center legs had 240 turns of copper wire.

Figure 8:
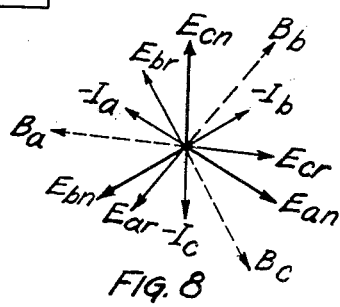
Fig. 8 is a vector diagram illustrating the relation of the currents, voltages and fluxes in the embodiment of the invention shown in Fig. 7.

Fig. 8 is a vector diagram illustrating the relation between the voltages, currents and fluxes in the form of the invention shown in Fig. 7. Voltage vectors Ean, Ebn and Ecn represent the phase voltages between the respective power line leads and the neutral point. For unity power-factor operation, the motor currents are in phase with their respective phase voltages to neutral. In this embodiment of my invention, all phase voltages to neutral and all motor currents are utilized in the regulating devices 28a, 28b and 28c.

Each phase voltage and its motor current energize one device which operates to control the direct-current output of one pair of half-wave rectifiers. Since the current windings 29a, 29b and 29c are reversed and reactive, their currents —Ia, —Ib, and —Ic must lag by nearly 90°, their respective voltages Ean, Ebn and Ecn. Voltages Ean, Ebn and Ecn each produce fluxes in legs 15a, 15b and 15c and 16a, 16b and 16c of the regulating devices 28a, 28b and 28c and the amount of flux varies with the corresponding voltage. Similarly, voltages Ear, Ebr and Ecr produce in legs 14a, 14b and 14c fluxes which vary with the motor current of the respective phases of the motor. These current and voltage fluxes combine in leg 15 of each of the devices 28a, 28b and 28c to produce resultant fluxes Ba, Bb and Bc in each leg 15 that are equal to the vectorial sums of the aforementioned fluxes.

It will be noted that in the form of the invention shown in Fig. 4, the current windings 29a, 29b and 29c act collectively to produce the required flux in regulating device 128 to give the necessary field excitation current, while in the form of the invention shown in Fig. 7, these current windings act independently, and the direct currents produced thereby are combined to produce a resultant current of the required magnitude. It will become evident, however, that with six rectifier tubes instead of two, more nearly uniform direct-current will be produced.

Figure 9:
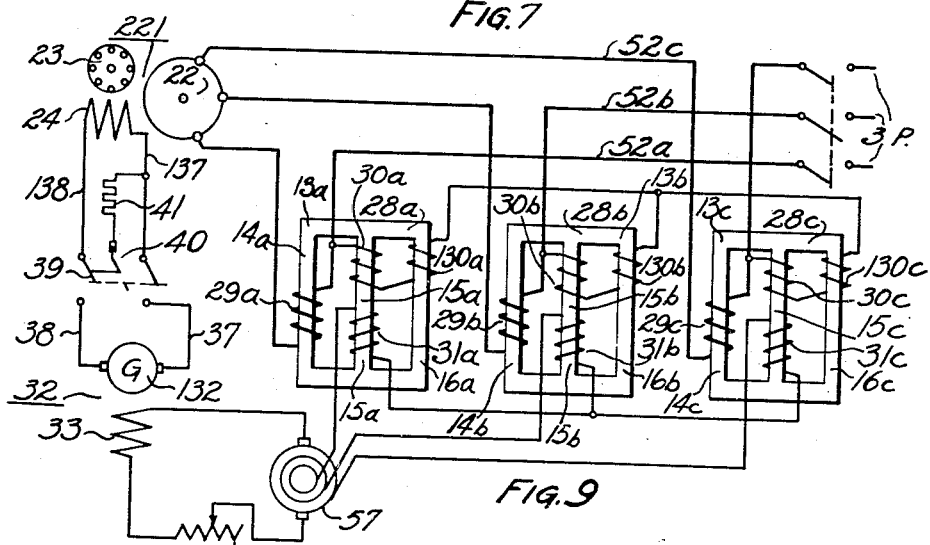
Fig. 9 is a wiring diagram illustrating a modification of the form of the invention shown in Fig. 7.

In Fig. 9 I have shown a further modification of my invention for a three-phase synchronous motor 221 utilizing a synchronous converter 57 for controlling the direct current excitation to the motor field winding 24. This modification of my invention is somewhat similar to that shown in Fig. 7 except that no rectifiers are utilized and consequently no heater windings are required for heating up or energizing the cathodes or filaments of the rectifiers. In this modification, the induced voltages in regulating windings 31a, 31b and 31c on legs 15a, 15b and 15c of the regulating devices 28a, 28b and 28c cooperate to supply a three-phase alternating current to the synchronous converter 57. The voltage of the direct-current output of the synchronous converter 57 is controlled by the input voltage of the alternating current which is obtained from the induced voltages in the regulating windings 31a, 31b and 31c. Thus the induced voltages in the regulating windings directly control the direct-current output of the synchronous converter 57 which furnishes the direct current for energizing the shunt field winding 33 of the generator 32. A rheostat 61 is included in the shunt field circuit of the generator 32 so that the direct-current excitation can be manually adjusted as desired.

The operation from no load up to full load on the motor shown in Fig. 9 is similar to that of the prior modifications of my invention in that the direct-current excitation to the motor field winding increases with load to supply the necessary direct-current excitation to the motor field winding 24 and thereby maintains substantially the desired efficiency, pull-out torque and power factor from no-load to full-load operation of the motor.

It will be understood that my invention is not limited to any specific type of rectifying device since it is obvious that thermionic rectifiers of both the half-wave and full-wave types, mercury arc rectifiers, copper-oxide rectifiers, synchronous converters and the like may be used. It will also be understood that suitable potential and/or current transformers may be used on high voltage systems or large current systems. To obtain flexibility in the operative characteristics, taps may be used on the various windings and variable impedances may be inserted so that the desired characteristics will result.

It will also be understood that the various features of the different forms of the invention may be incorporated in any of the modifications disclosed, without departing from the spirit of the invention and that other modifications may be made by combining certain of the elements of one form with other elements of other forms of the invention.

My invention besides being applicable to one and three-phase systems as described herein, is obviously applicable to other polyphase systems by suitable changes which can be readily determined by one skilled in the art.

While theories have been advanced as to operation of the regulating device and methods here described, this has been done with a view to facilitating the description thereof and it is to be understood that I do not bind myself to these or any other theories.

The advantages of my invention are as follows: My invention provides a simple, automatic, and instantaneous means of providing over-excitation current which results in increased pull-out torque coincident with increase of load whether gradually or suddenly increased. Thus a synchronous motor of standard design will be able to successfully carry peak loads much greater than the maximum peak load the same motor will carry with constant field excitation current fixed at normal full-load value. Similarly, a synchronous motor especially designed for extreme variations in load such as occur in steel-mill roll drives, may, by using my invention, be made to successfully carry peak loads much greater than it will carry with constant excitation current fixed at normal full-load value. In such special drives the size and cost of the motor are largely determined by its capacity to carry peak loads. Thus my invention for increasing the peak-load capacity of any synchronous motor makes possible the use of a smaller and less expensive motor for any given application. With my invention, the motor power factor can be controlled to give a rising value in the leading direction, or a falling value in the lagging direction, or even maintain a constant value—all with increasing load. For best efficiency, the power factor should be maintained at unity for all loads. It will also be noted that the efficiency of the motor is increased, the motor heating is decreased, and the operating characteristics of the power line improved. With my invention where a short circuit occurs in the power line or motor armature, the motor does not operate as a generator and hence does not feed current into the short circuit. This is due to two principal factors. First, the short-circuited current in the current windings acts to produce a large flux that will flow through the right outside leg instead of through the center leg which carries the regulating winding for supplying or regulating the excitation current to the motor field winding. Second, the voltage across the two potential windings becomes zero during short circuit so that these windings act as a choke coil to rapidly reduce the amount of flux flowing and thereby operate to rapidly reduce the magnitude of the short-circuited current. Both factors immediately cooperate to annihilate the excitation current to the motor field winding so that the machine cannot act as a generator to feed current into the short circuit. Thus switching equipment of lower capacity may be used in conjunction therewith.

It will, of course, be understood that various changes may be made in the form, details, proportions and arrangements of the parts, without departing from the scope of my invention which, generally stated, consists in a device capable of carrying out the objects above set forth and in the novel parts and combination of parts disclosed and defined in the appended claims.

What I claim as new and desire to secure by Letters Patent of the United States is:

1. In a device for regulating a condition of a main electric circuit controllable by an auxiliary electric circuit, a magnetic core comprising three legs in parallel, a potential winding on one of said legs, a second potential winding on another of said legs, said windings being connected in series and energized by potential of said main circuit, a current winding on said third leg and connected in said main circuit, and a regulating winding on one of said first named legs connected to said auxiliary circuit.

2. In a device for regulating a condition of a main electric circuit controllable by an auxiliary electric circuit, a magnetic core comprising a plurality of legs in excess of two arranged in parallel, potential windings on a plurality of said legs, said potential windings being connected in series and energized by potential of said circuit, a current winding on a leg other than the legs having said potential windings, and connected in said main circuit, and a regulating winding on one of said legs having the potential windings, said regulating winding being connected to said auxiliary circuit.

3. In a device for regulating a condition in a polyphase electric circuit controllable by an auxiliary electric circuit, a magnetic core comprising a plurality of legs in excess of two arranged in parallel, potential windings on a plurality of said legs, said windings being connected in series and energized by the potential of one phase of said polyphase circuit, a plurality of current windings on another of said legs, each of said current windings being energized by the current of one of said phases of the polyphase circuit, and means energized by the magnetic flux through one of said legs having a potential winding, said means controlling the current in said auxiliary circuit.

4. In a device for regulating a condition of a main electric circuit controllable by an auxiliary electric circuit, a magnetic core comprising a plurality of legs in excess of two arranged in parallel, potential windings on a plurality of said legs, said windings being connected in series and energized by potential of said main circuit, a current winding on another of said legs and connected in said main circuit, and means energized by the magnetic flux through one of said first named legs for controlling the current in said auxiliary circuit.

5. In a device for regulating a condition of a main electric circuit controllable by an auxiliary electric circuit, a magnetic core comprising three legs in parallel, a potential winding on one of said legs, a second potential winding on another of said legs, said windings being connected in series and energized by potential of said main circuit, and being connected so as to produce components of magnetic flux in the same direction in one certain of said legs, a current winding on said third leg and connected in said main circuit, said current winding being connected so as to produce with the flux produced by said potential winding a resultant magnetic flux in said aforementioned certain leg of greater magnitude than either of said component fluxes and a regulating winding on said aforementioned certain leg connected to said auxiliary circuit.

6. In combination with a synchronous motor having an armature and a field winding, a regulating device comprising a magnetic core having a plurality of legs in excess of two arranged in parallel, potential windings on a plurality of said legs, said windings being connected in series and energized by armature potential, a current winding on a leg other than the legs having said potential windings and energized by armature current, a regulating winding on one of said first named legs, and means controlled by said regulating winding for regulating excitation for said field winding.

7. In combination with a synchronous motor having an armature and a field winding, a regulating device comprising a magnetic core having a plurality of legs in excess of two arranged in parallel, potential windings on a plurality of said legs, said windings being connected in series and energized by armature potential, a current winding on a leg other than the legs having said potential windings and energized by armature current, a regulating winding on one of said first named legs, and means controlled by said regulating winding and including a rectifier for supplying and regulating excitation current to said field winding.

8. In combination with a synchronous motor having an armature and a field winding, a regulating device comprising a magnetic core having a plurality of legs in excess of two arranged in parallel, potential windings on a plurality of said legs, said windings being connected in series and energized by armature potential, a current winding on a leg other than the legs having said potential windings and energized by armature current, a plurality of regulating windings on said first named legs, and means controlled by said regulating windings including a rectifier energized by certain of said regulating windings, said means supplying and regulating excitation current to said field winding.

9. In combination with a synchronous motor having an armature and a field winding, a regulating device comprising a magnetic core having a plurality of legs in excess of two arranged in parallel, potential windings on a plurality of said legs, said windings being connected in series and energized by armature potential, a current winding on a leg other than the legs having said potential windings and energized by armature current, a regulating winding on one of said first named legs, a direct-current generator for supplying excitation current for said synchronous motor field winding, and means controlled by said regulating winding for regulating the field excitation of said generator.

10. In combination with a synchronous motor having an armature and a field winding, a regulating device comprising a magnetic core having a plurality of legs in excess of two arranged in parallel, potential windings on a plurality of said legs, said windings being connected in series and energized by armature potential, a current winding on a leg other than the legs having said potential windings and energized by armature current, a plurality of regulating windings on said first named legs, a thermionic full wave rectifier for supplying excitation current for said field winding, said rectifier having a cathode in the form of a filament and anodes, certain of said regulating windings being connected to said filament, and other of said windings being connected to said anodes, and a field excitation circuit connected to said field winding and energized by said rectifier.

11. An excitation current regulator for a synchronous motor having an armature and a field winding, said regulator comprising a magnetic core having a plurality of legs in excess of two arranged in parallel, potential windings on a plurality of said legs, said windings being connected in series and being adapted for energization by armature potential, a current winding on a leg other than the legs having said potential windings and adapted for energization by armature current, a regulating winding on one of said first named legs, and field excitation regulating means controlled by said regulating winding.

12. In combination with a synchronous motor having an armature and a field winding, a regulating device comprising a magnetic core having a plurality of legs in excess of two arranged in parallel, potential windings on a plurality of said legs, said windings being connected in series and energized by armature potential, a current winding on a leg other than the legs having said potential windings and energized by armature current, a regulating winding on one of said first named legs, a circuit for supplying excitation current to said field winding, a rectifier having a cathode and an anode, one side of said regulating winding being connected to the anode, said regulating winding being further connected to said excitation circuit, means for connecting the cathode to said excitation circuit, and means for heating said cathode.

13. In combination with a three-phase synchronous motor having an armature provided with windings connected in star formation and a field winding, a regulating device comprising three transformers, each transformer comprising a magnetic core having three legs arranged in parallel, potential windings on two of the legs of each transformer, the potential windings of each transformer being connected in series and being further connected together and to the terminals of the armature winding in star formation, current windings on the third legs of each transformer, said current windings being separately energized by the currents of the armature windings, a regulating winding on one of the first named legs of each transformer, thermionic rectifiers having cathodes and anodes, a circuit for supplying excitation to said field winding, said regulating windings being connected to corresponding rectifier anodes and to said excitation circuit, said cathodes being connected to said excitation circuit, and means for heating said cathodes.

14. In combination with a synchronous motor having an armature and a field winding, a regulating device comprising a magnetic core having a plurality of legs in excess of two arranged in parallel, potential windings on a plurality of said legs, said windings being connected in series and energized by armature potential, a current winding on a leg other than the legs having said potential windings and energized by armature current, a regulating winding on one of said first named legs, a circuit for controlling the excitation current to said field winding, a variable resistance in said circuit, motive means for varying said resistance, and means energized by said regulating winding for operating said motive means.

15. In combination with a synchronous motor having an armature and a field winding, a regulating device comprising a magnetic core having a plurality of legs in excess of two arranged in parallel, potential windings on a plurality of said legs, said windings being connected in series and energized by armature potential, a current winding on a leg other than the legs having said potential windings and energized by armature current, a regulating winding on one of said first named legs, rectifier means for supplying excitation current to said field winding, and means connected to said regulating winding for energizing said rectifier means.

16. In combination with a synchronous motor having an armature and a field winding, a regulating device comprising a magnetic core having a plurality of legs in excess of two arranged in parallel, potential windings on a plurality of said legs, said windings being connected in series and energized by armature potential, a current winding on a leg other than the legs having said potential windings and energized by armature current, a regulating winding on one of said first named legs, a synchronous converter for controlling the excitation current to said field winding, and a circuit including said regulating winding for energizing said synchronous converter.

17. In combination with a synchronous motor having an armature and a field winding, a regulating device comprising a magnetic core having a plurality of legs in excess of two arranged in parallel, potential windings on a plurality of said legs, said windings being connected in series and energized by armature potential, a current winding on a leg other than the legs having said potential windings and energized by armature current, a regulating winding on one of said first named legs, a direct-current generator including a field winding, rectifier means for supplying excitation current to said generator field winding, and means controlled by said regulating winding for energizing said rectifier means.

18. In a device for regulating a condition of a main electric circuit controllable by an auxiliary electric circuit, inductive means producing in a portion of a magnetic circuit a magnetic flux component varying with the main circuit potential, other inductive means producing in the same portion of said magnetic circuit a flux component varying with the main circuit current, said inductive means being arranged to produce in said portion of the magnetic circuit a resultant flux of a magnitude greater than the magnitude of either of said flux components, and regulating means energized by the resultant flux and controlling the current in said auxiliary electric circuit.

EDWIN W. SWANSON.